United States Patent
Duchin et al.

(10) Patent No.: US 10,038,700 B1
(45) Date of Patent: Jul. 31, 2018

(54) ESTABLISHING TRUSTWORTHINESS OF DEVICES IN THE INTERNET OF THINGS (IOT) TO CONTROL INTER-DEVICE COMMUNICATION

(71) Applicant: EMC Corporation, Hopkinton, MA (US)

(72) Inventors: Zohar Duchin, Herzliya (IL); Alon Kaufman, Herut (IL); Alex Zaslaysky, Petah Tiqwa (IL); Mikael Peres, Raanana (IL); Marcelo Blatt, Modiin (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 156 days.

(21) Appl. No.: 15/083,600

(22) Filed: Mar. 29, 2016

(51) Int. Cl.
  *H04L 7/10* (2006.01)
  *H04L 29/06* (2006.01)
  *H04L 29/08* (2006.01)
  *H04L 29/14* (2006.01)

(52) U.S. Cl.
  CPC ............ *H04L 63/102* (2013.01); *H04L 67/12* (2013.01)

(58) Field of Classification Search
  None
  See application file for complete search history.

(56) References Cited

U.S. PATENT DOCUMENTS

| | | | |
|---|---|---|---|
| 8,418,249 B1 | 4/2013 | Nucci et al. | |
| 9,154,516 B1 * | 10/2015 | Vaystikh | H04L 63/1425 |
| 2007/0289013 A1 | 12/2007 | Lim | |
| 2012/0137340 A1 * | 5/2012 | Jakobsson | G06F 21/316 726/1 |
| 2013/0283378 A1 * | 10/2013 | Costigan | G06F 21/55 726/23 |
| 2015/0150104 A1 * | 5/2015 | Melzer | G06F 21/316 726/7 |
| 2015/0178496 A1 * | 6/2015 | Kohlenberg | G06F 21/316 726/23 |

(Continued)

OTHER PUBLICATIONS

Wireless Anomaly Detection Based on IEEE 802.11 Behavior Analysis. Alipour et al. IEEE(2015).*

(Continued)

*Primary Examiner* — Venkat Perungavoor
(74) *Attorney, Agent, or Firm* — BainwoodHuang

(57) ABSTRACT

Technology for establishing trustworthiness of devices in the Internet of Things (IoT), and for controlling communications between devices based on the trustworthiness scores of individual devices. A hub computer collects behavioral characteristics from multiple devices, and calculates trustworthiness scores for individual devices by comparing recently collected behavioral characteristics to expected behavioral characteristics. The expected behavioral characteristics may include i) historically collected behavioral characteristics for the device, and/or ii) expected behavioral characteristics for devices in a device group to which the device belongs. The trustworthiness scores are obtained from the hub by individual devices to control communication with other devices. A composite trustworthiness score for a device may also be calculated at the hub computer based on the trustworthiness scores of other devices with which the device has previously communicated.

17 Claims, 7 Drawing Sheets

(56) References Cited

U.S. PATENT DOCUMENTS

| | | | | |
|---|---|---|---|---|
| 2016/0066189 A1* | 3/2016 | Mahaffey | ............ | G06F 21/316 |
| | | | | 455/405 |
| 2016/0103997 A1* | 4/2016 | Lu | ....................... | G06F 21/577 |
| | | | | 726/22 |
| 2016/0359838 A1* | 12/2016 | Dasgupta | ............ | H04L 63/083 |

OTHER PUBLICATIONS

Data Mining for Internet of Things: A Survey. Tsai et al. IEEE(2014).*

Brin et al., "The Anatomy of a Large-Scale Hypertextual Web Search Engine", Computer Science Department, Stanford University, 1997, 20 pages.

* cited by examiner

ESTABLISHING TRUSTWORTHINESS OF DEVICES IN THE INTERNET OF THINGS (IOT) TO CONTROL INTER-DEVICE COMMUNICATION

BACKGROUND

As it is generally known, the Internet of Things (IoT) is the network of physical "things" that are embedded with electronics, software, and sensors, and that also have network connectivity. The "things" in the IoT include a wide variety of devices that are capable of collecting and exchanging data. Examples of IoT devices include "smart" devices such as vehicles (e.g. cars, trucks, buses, etc.), household appliances (e.g. refrigerators, clothes washing machines, clothes dryers, dishwashers, etc.), medical devices (e.g. heart monitoring implants), sensors (e.g. thermostats), and many other specific types of devices that operate to collect useful data, and can autonomously communicate the collected data with one or more other IoT devices.

According to current estimates, in the near future there will be greater than 25 billion IoT devices installed across the world. These devices communicate with each other, with humans, and with various different applications. While the availability of a large number of autonomously communicating, smart devices opens up many opportunities to improve the people's lives, a significant security challenge also arises, since many IoT devices have access to personal information, and/or are capable of performing actions that negatively impact the operation of other IoT devices, and/or of performing actions that negatively impact the lives of people.

SUMMARY

In view of the potential benefits and risks involved in autonomous communication between IoT devices, in many circumstances it would be desirable to establish a level of trustworthiness for an individual IoT device, prior to communicating with that device, in order to ensure that the device is not being impersonated by a malicious entity.

Unfortunately, previous technologies for providing device to device authentication have required human involvement during the authentication process. For example, many previous technologies have required users to enter a username/password combination, fingerprint, etc. These previous technologies are not feasible to support secure communication between IoT devices, since in the IoT context, there is often no human involved in the authentication process at all. Previous authentication technology has been designed for use with close-by devices such as user's smartwatch and mobile phone, but is not appropriate for the occasional passer-by communication connections that IoT devices are often exposed to. Previous authentication approaches have also typically been managed by a remote server, and such configurations are not consistent with the increasingly common "fog architecture" computing approach, in which increasing amounts of functionality are pushed to devices that are close to the communication endpoint, or that are themselves communication endpoints. And finally, previous authentication technologies have focused on the point in time at which a device is authenticated, without paying attention to device behavior after the point in time at which authentication is performed.

To address these and other shortcomings of previous technologies, a new technical solution is disclosed for establishing trustworthiness of devices in the Internet of Things (IoT), and for controlling communications between IoT devices based on the trustworthiness scores of individual devices. The disclosed technology continuously collects, at a hub computer, behavioral characteristics from multiple devices. Specifically, the behavioral characteristics are transmitted from the individual devices to the hub computer, and the hub computer stores the collected behavioral characteristics internally.

The hub computer may perform a trustworthiness operation with regard to each individual one of the devices, in order to calculate and store a trustworthiness score specifically for that device. During the trustworthiness operation for a specific device, the hub computer extracts, from the collected behavioral characteristics, a set of behavioral characteristics most recently collected from the device. The hub computer also retrieves one or more sets of expected behavioral characteristics, and compares the set of behavioral characteristics most recently collected from the device to the set(s) of expected behavioral characteristics. The hub computer then calculates a trustworthiness score for the device that indicates an amount of similarity between the set of behavioral characteristics most recently collected from the device and the set(s) of expected behavioral characteristics, and stores the trustworthiness score calculated for the device.

The hub computer also receives, from a first one of the devices, a request for the trustworthiness score of a second one of the devices. In response to the request for the trustworthiness score, the hub computer retrieves the trustworthiness score for the second device and transmits the trustworthiness score for the second device to the requesting first device. In response to receipt, by the first device, of the trustworthiness score for the second device, the first device compares the trustworthiness score for the second device to a trustworthiness safety threshold, and prevents communications between the first device and the second device in response to the trustworthiness score for the second device being less than the trustworthiness safety threshold. Alternatively, the second device may be granted only limited access, e.g. to only some portion of the information or resources contained within the first device, in response to trustworthiness score for the second device being less than the trustworthiness safety threshold.

The trustworthiness operation performed by the hub computer for a specific device may retrieve a historical set of behavioral characteristics for the device as one of the one or more set(s) of expected behavioral characteristics, for comparison to the set of behavioral characteristics most recently collected from that device. For example, the hub computer may extract the set of behavioral characteristics most recently collected from a device by extracting behavioral characteristics that were collected from the device during a recent time period. The trustworthiness operation may further include generating a historical set of behavioral characteristics for the device by extracting, from the collected behavioral characteristics, at least one behavioral characteristic that was collected from the device within a historical time period preceding the recent time period. The hub computer may then store the historical set of behavioral characteristics for the device, and retrieve the historical set of behavioral characteristics for the device as one of the one or more sets of expected behavioral characteristics for comparison to the set of behavioral characteristics most recently received from the device.

The trustworthiness operation performed by the hub computer may alternatively, or additionally, retrieve a set of behavioral characteristics for a device group that includes a specific device, as one of the one or more set(s) of expected behavioral characteristics for comparison to the set of behavioral characteristics most recently collected from that device. For example, the hub computer may determine whether the device is one of the members of a device group that is a subset of the devices from which behavioral characteristics are collected by the hub computer. In response to determining that the device is one of the members of the device group, the hub computer retrieves a set of expected behavioral characteristics associated with the device group as one of the one or more sets of expected behavioral characteristics for comparison to the set of behavioral characteristics most recently received from the device.

The trustworthiness operation performed by the hub computer for a device may further include generating the set of expected behavioral characteristics for a device group by extracting, from the collected behavioral characteristics, one or more behavioral characteristics that were previously collected by the hub computer from at least one other device that is a member of the device group.

The disclosed technology may determine whether a device is a member of a device group by comparing one or more behavioral characteristics collected from the device to one or more behavioral characteristics collected from other devices that are members of the device group, and then determining that the device is a member of the device group in response to the behavioral characteristics collected from the device matching the behavioral characteristics collected from at least a majority of the other devices that are members of the device group, and alternatively determining that the device is not a member of the device group in response to the behavioral characteristics collected from the device not matching the behavioral characteristics collected from at least a majority of the other devices that are members of the device group.

A device group may consist of devices that are all of the same type. In other words, each member of a device group have same device type as each other member of the device group. For such a device group, the hub computer may determine whether a device is a member of the device group by receiving an indication, from the device, of a device type of the device, and then comparing the device type received from the device to the single, common device type of the members of the device group. Based on this comparison, the hub computer may determine that the device is a member of the device group in response to the device type received from the device matching the device type of the members of the device group, or alternatively determine that the device is not a member of the device group in response to the device type received from the device not matching the device type of the members of the device group.

The trustworthiness operation performed by the hub computer for a device may retrieve both i) a historical set of behavioral characteristics for the device, and ii) a set of behavioral characteristics for a device group that includes the device, as the one of the one or more set(s) of expected behavioral characteristics, for comparison to the set of behavioral characteristics most recently collected from the device. In such an example, the hub computer generates a historical set of behavioral characteristics for the device by extracting, from the collected behavioral characteristics, at least one behavioral characteristic that was received by the hub computer within a historical time period, wherein the historical time period precedes a recent time period during which the set of behavioral characteristics most recently collected from the device were collected by the hub computer. The hub computer then stores the historical set of behavioral characteristics for the device within the hub computer. The hub computer also determines whether the device is a member of a device group that is a subset of the devices from which behavioral characteristics are collected. Retrieving the one or more sets of expected behavioral characteristics associated with the device from within the hub computer may then include i) retrieving the historical set of behavioral characteristics for the device, and ii) in response to determining that the device is a member of the device group, retrieving a set of expected behavioral characteristics associated with the device group. Comparing the set of behavioral characteristics most recently collected from the device to the one or more sets of expected behavioral characteristics may then include i) comparing the set of behavioral characteristics most recently collected from the device to the historical set of behavioral characteristics for the device, and ii) comparing the set of behavioral characteristics most recently received from the device to the set of expected behavioral characteristics associated with the device group. Calculating the trustworthiness score for the device may then include calculating a trustworthiness score that indicates both i) an amount of similarity between the set of behavioral characteristics most recently collected from the device and the historical set of behavioral characteristics for the device, and ii) an amount of similarity between the set of behavioral characteristics most recently received from the device and the set of expected behavioral characteristics associated with the device group.

The disclosed technology may further operate to calculate a composite trustworthiness score for a device, using the trustworthiness scores of all devices within which the device has previously communicated. For example, the hub computer may maintain, for each one of the devices from which behavioral characteristics are collected, a list of all other devices with which the device has communicated. Performing the trustworthiness operation for a device may then further include retrieving the trustworthiness score of each one of the other devices with which the device has communicated, and calculating a composite trustworthiness score for the device by combining the trustworthiness scores of the other devices with which the second device has communicated. In a case in which such a composite trustworthiness score is calculated for each device, the hub computer may alternatively or additionally provide the composite trustworthiness for the second device to the first device in response to the trustworthiness score request received from the first device. The first device may then compare the composite trustworthiness score for the second device to the trustworthiness safety threshold, and prevent communications between the first device and the second device in response to the composite trustworthiness score for the second device being less than the trustworthiness safety threshold.

The behavioral characteristics collected at the hub computer may include various specific types of behavioral characteristics, such as, for example i) daily time periods during which the device has externally communicated data, ii) an average rate at which the device has externally communicated data, iii) port numbers of communication ports used by the device to externally communicate data, iv) identifiers of software programs that have executed on the device, and/or v) identifiers of all other devices with which the device has communicated.

Embodiments of the disclosed technology may solve significant problems inherent in previous technologies. For example, because the disclosed technology does not require human involvement, e.g. does not require a human to enter a username/password combination, fingerprint, etc., it can be used to support secure communication between IoT devices that communicate autonomously with each other. The disclosed technology can be used in the typical passer-by connections between devices that are common for IoT devices, and is not limited to use with close-by devices. The disclosed technology provides trustworthiness scores to IoT devices that determine whether communication is to be permitted or prevented with other IoT devices, consistent with the goals of the "fog architecture" computing approach, in which it is desirable that functionality be pushed out to communication endpoints. And by continuously collecting behavioral characteristics from all devices, the disclosed technology supports finding suspicious changes in device behavior even after a device has been determined to be sufficiently trustworthy to allow communications with another device.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments of the invention will now be described. It should be understood that such embodiments are provided only by way of example and to illustrate various features and principles of the invention, and that the invention itself is broader than the specific examples of embodiments disclosed herein.

The individual features of the particular embodiments, examples, and implementations disclosed herein can be combined in any desired manner that makes technological sense. Moreover, such features are hereby combined in this manner to form all possible combinations, permutations and variants except to the extent that such combinations, permutations and/or variants have been explicitly excluded or are impractical. Support for such combinations, permutations and variants is considered to exist in this document.

Figure 1:
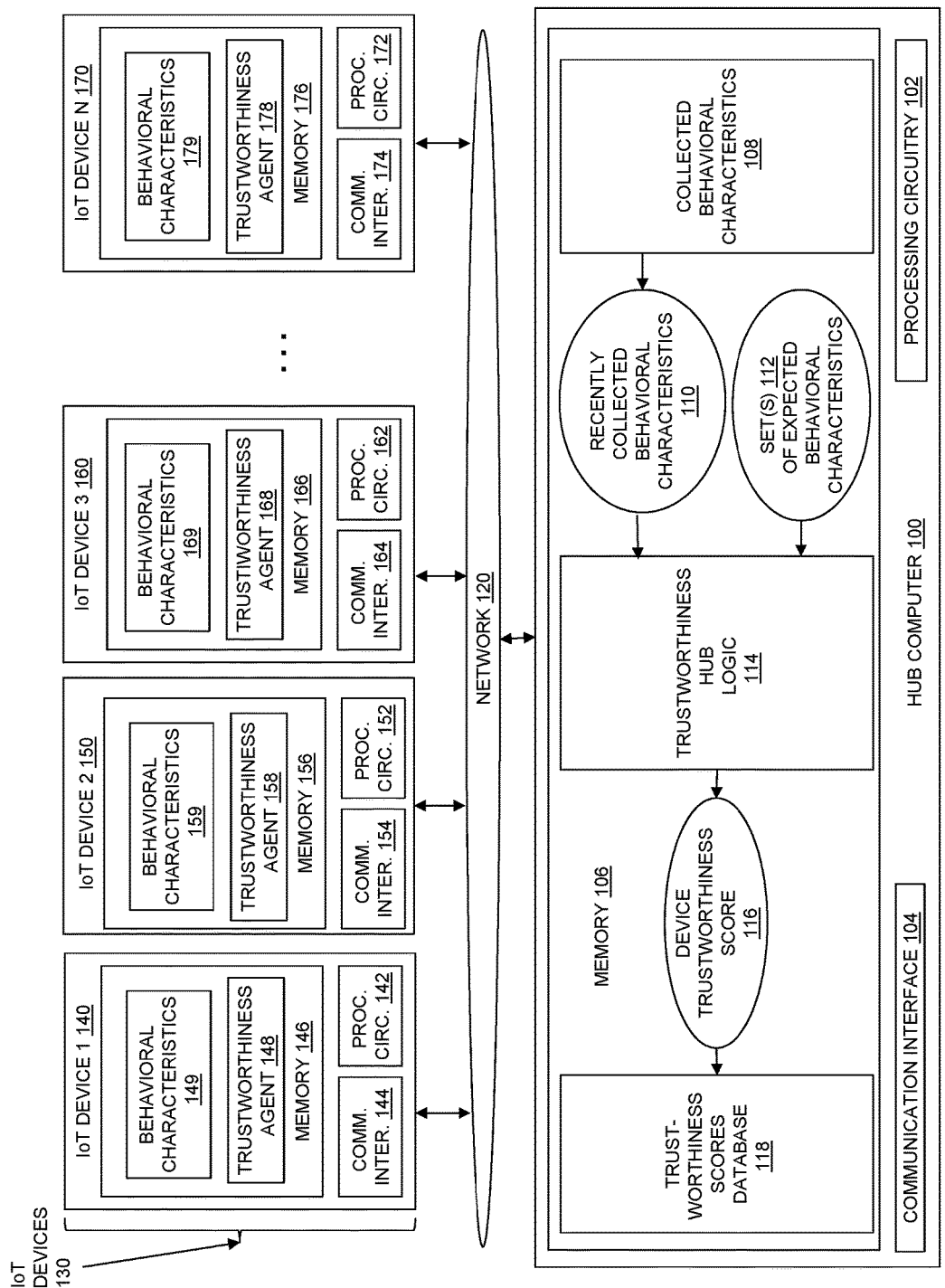
FIG. 1 is a block diagram showing an example of components in an illustrative embodiment of the disclosed system while operating to continuously collect behavioral characteristics from multiple IoT devices in a hub computer, and to perform a trustworthiness operation in the hub computer to calculate a trustworthiness score for an individual one of the IoT devices.

FIG. 1 is a block diagram showing an example of components in an illustrative embodiment of the disclosed system while operating to continuously collect behavioral characteristics from multiple IoT devices in a hub computer, and to perform a trustworthiness operation in the hub computer to calculate a trustworthiness score for an individual one of the IoT devices. As shown in FIG. 1, a Hub Computer 100 includes Processing Circuitry 102, Communication Interface 104, and Memory 106. As also shown in FIG. 1, a set of N internet of things (IoT) Devices 130 includes IoT Device 1 140, IoT Device 2 150, IoT Device 3 160, through IoT Device N 170. Each one of IoT Devices 130 includes processing circuitry, a communication interface, and memory, as shown by Processing Circuitry 142, Communication Interface 144, and Memory 146 in IoT Device 1 140, Processing Circuitry 152, Communication Interface 154, and Memory 156 in IoT Device 2 150, Processing Circuitry 162, Communication Interface 154 and Memory 166 in IoT Device 3 160, and Processing Circuitry 172, Communication Interface 174 and Memory 176 in IoT Device N 170.

Processing Circuitry 102, 142, 152, 162, and 172 may, for example, each include or consist of one or more microprocessors or the like. Communication Interfaces 104, 144, 154, 164 and 174 may, for example, each include or consist of one or more network interface cards (NICs) or the like. And Memory 106, 146, 156, 166, and 176 may each include or consist of any specific type of volatile or non-volatile semiconductor memory or the like that is operable to store programs (e.g. sequences of instructions) and/or data (e.g. program state information, input data, output data, etc.) for use in the respective one of Hub Computer 100 and the IoT Devices 130.

Hub Computer 100 may consist of or include any specific type of computer or computer system, including but not limited to a computerized handheld device such as a smartphone or personal digital assistant, or a tablet computer, laptop computer, or desktop computer.

Each one of IoT Devices 130 may be embodied as any specific type of "smart" device, such as a vehicle (e.g. car, truck, bus, etc.), household appliance (e.g. refrigerator, clothes washing machine, clothes dryer, dishwasher, etc.), medical device (e.g. heart monitoring implant), sensor (e.g. thermostat), and any other specific type of IoT device that operates to collect useful data (e.g. using one or more sensors contained within the device), and to then autonomously communicate the collected data with one or more other ones of the IoT Devices 130.

The Memory 106 of Hub Computer 100 stores program code for execution by the Processing Circuitry 102, shown in the example of FIG. 1 as including Trustworthiness Hub Logic 114. The memory of each one of the IoT Devices 130 stores program code for execution on the processing circuitry of the device, shown in FIG. 1 as including Trustworthiness Agent 148 in Memory 146 of IoT Device 1 140, Trustworthiness Agent 158 in Memory 156 of IoT Device 2 150, Trustworthiness Agent 168 in Memory 166 of IoT Device 3 160, and Trustworthiness Agent 178 in Memory 176 in IoT Device N 170.

In addition, those skilled in the art will further recognize that while only certain examples of program code are shown in FIG. 1 for purposes of concise illustration and explanation with regard to each of Hub Computer 100 and IoT Devices 130, other specific program code or logic may also be present in each of Memory 106, Memory 146, Memory 156, Memory 166, and/or Memory 176. Such additional software may, for example, include operating system, middleware, and/or various specific types of application program code.

Hub Computer 100 and IoT Devices 130 may all be communicably interconnected by a Network 120 that is made up of one or more communication networks and/or computer networks that allow computers to exchange data. Such networks may, for example, include or consist of one or more Local Area Networks (LANs), Wireless Local Area Networks (WLANs), Wide Area Networks (WANs), e.g. the Internet, and/or any other specific type of network. Messages communicated over Network 120 may be embodied and exchanged based on one or more communication protocols including, but not limited to, Hypertext Transfer Protocol (HTTP), Transmission Control Protocol (TCP), Internet Protocol (IP), Ethernet, Wi-Fi, and/or any other specific communication protocol that may be appropriate for a particular network or embodiment.

During operation of the components shown in FIG. 1, the Trustworthiness Hub Logic 114 and trustworthiness agents within each of the IoT Devices 130 provide an embodiment of the disclosed techniques for controlling communication between individual ones of the IoT devices 130 based on trustworthiness scores. In the embodiment shown in FIG. 1, the Hub Computer 100 continuously collects behavioral characteristics from the IoT Devices 130. For example, Trustworthiness Hub Logic 114 may operate to periodically collect behavioral characteristics from each one of the IoT Devices 130, and to store the collected behavioral characteristics in Memory 106, as shown by Collected Behavioral Characteristics 108.

Trustworthiness Hub Logic 114 may collect behavioral characteristics from each one of the IoT Devices 130 by receiving behavioral characteristics that are transmitted from each one of the IoT Devices 130 to Hub Computer 100. For example, the behavioral characteristics of IoT Devices 130 may be transmitted to Hub Computer 130 by the trustworthiness agent within each respective one of the IoT Devices 130. Accordingly, Behavioral Characteristics 149 of IoT Device 1 140 may be transmitted to Hub Computer 100 by Trustworthiness Agent 148, Behavioral Characteristics 159 of IoT Device 2 150 may be transmitted to Hub Computer 100 by Trustworthiness Agent 158, Behavioral Characteristics 169 of IoT Device 3 160 may be transmitted to Hub Computer 100 by Trustworthiness Agent 168, and so on, with Behavioral Characteristics 179 of IoT Device N 170 transmitted to Hub Computer 100 by Trustworthiness Agent 178.

The behavioral characteristics of the IoT Devices 130 are collected continuously by Hub Computer 100. Accordingly, each one of the trustworthiness agents within the IoT Devices 130 may periodically transmit the behavioral characteristics of its IoT device to Hub Computer 100, e.g. once per second, once per minute, once per hour, once per day, or at any other specific periodicity as may be desirable for a given embodiment or configuration. The trustworthiness agents within the IoT Devices 130 may alternatively, or in addition, transmit the behavioral characteristics of their respective one of the IoT Devices 130 in response to requests, e.g. periodically generated requests issued from Hub Computer 100 (e.g. from Trustworthiness Hub Logic 114).

The specific behavioral characteristics of IoT Devices 130 collected by Hub Computer 100 may include various specific types of behavioral characteristics, indicating the operation and/or configuration of the individual IoT devices in IoT Devices 130. For example, the collected behavioral characteristics for a given IoT device may indicate a communication profile of the device, describing how and with which other devices the device has been communicating. Behavioral characteristics collected from individual ones of the IoT Devices 130 may, for example, include i) a behavioral characteristic indicating one or more daily time periods during which the device has previously externally communicated data (e.g. specific hours of the day during which the device has transmitted or received data), ii) a behavioral characteristic indicating an average rate at which the device has externally communicated data (e.g. an average rate at which data has previously been transmitted and/or received by the device), iii) a behavioral characteristic indicating the port numbers of communication ports previously used by the device to transmit or receive data, iv) a behavioral characteristic indicating software programs that have executed on the device (e.g. a list of the names of the applications that have executed on the device), and/or v) a behavioral characteristic indicating each of the other devices with which the device has communicated (e.g. a list of the device names and/or network addresses of other devices with which the device has communicated). The preceding behavioral characteristics are provided for purposes of example and explanation, and those skilled in the art will recognize that the disclosed techniques may be embodied using various other specific behavioral characteristics of IoT devices, as may be appropriate or desirable for a specific embodiment or configuration.

Further during operation of the embodiment shown in FIG. 1, the Hub Computer 100 continuously performs trustworthiness operations for each one of the IoT Devices 130. For example, the Trustworthiness Hub Logic 114 executing on Processing Circuitry 102 may periodically perform a trustworthiness operation for each of the IoT devices in IoT Devices 130, e.g. once per second, once per minute, once per hour, once per day, or at any other specific periodicity as may be desirable for a given embodiment or configuration. For example, during a trustworthiness operation performed for a specific IoT device, e.g. for IoT Device 2 150, the Trustworthiness Hub Logic 114 extracts, from the Collected Behavioral Characteristics 108, behavioral characteristics most recently collected from the device, shown in FIG. 1 by Recently Collected Behavioral Characteristics 110. The Recently Collected Behavioral Characteristics 110 may, for example, consist of one or more behavioral characteristics that were most recently received from the device, e.g. the Behavioral Characteristics 159 most recently received from IoT Device 2 150. Further during a trustworthiness operation performed for IoT Device 2 150, Trustworthiness Hub Logic 114 retrieves one or more sets of expected behavioral characteristics for IoT Device 2 150 from within the hub computer, shown in FIG. 1 by Set(s) 112 of Expected Behavioral Characteristics. Also during the trustworthiness operation, the Trustworthiness Hub Logic 114 compares the set of behavioral characteristics most recently collected from the device, e.g. the Behavioral Characteristics 159 most recently received from IoT Device 2 150, to the one or more sets of expected behavioral characteristics, e.g. to Set(s) 112 of Expected Behavioral Characteristics, and calculates a trustworthiness score, shown in FIG. 1 by Device Trustworthiness Score 116, for the device (e.g. for IoT Device 2 150).

The trustworthiness score (e.g. Device Trustworthiness Score 116) calculated by Trustworthiness Hub Logic 114 while performing a trustworthiness operation indicates an amount of similarity between the set of behavioral characteristics most recently collected from the device (e.g. the most recently received Behavioral Characteristics 159 received from IoT Device 2 150) and the behavioral characteristics in at least one set of expected behavioral characteristics (e.g. behavioral characteristics in Set(s) 112 of Expected Behavioral Characteristics). Any specific representation may be used for Device Trustworthiness Score 116 to represent the amount of similarity between the set of behavioral characteristics most recently collected from the device. For example Device Trustworthiness Score 116 may be a percentage indicating the percentage of behavioral characteristics in Recently Collected Behavioral Characteristics 110 that match behavioral characteristics in Set(s) 112 of Expected Behavioral Characteristics. Alternatively, matches with individual behavioral characteristics in the Set(s) 112 of Expected Behavioral Characteristics may be weighted based on various factors, with matches to some behavioral characteristics in the Set(s) 112 of Expected Behavioral Characteristics being more heavily weighted in the resulting Device Trustworthiness Score 116 than matches to other ones of the behavioral characteristics in the Set(s) 112 of Expected Behavioral Characteristics, as may be desirable for a specific embodiment or configuration.

Further while performing the trustworthiness operation, Trustworthiness Hub Logic 114 stores Device Trustworthiness Score 116 within Hub Computer 100, e.g. within Trustworthiness Scores Database 118. Trustworthiness Scores Database 118 may, for example, be embodied as a database that stores a trustworthiness score for each one of the IoT devices in IoT Devices 130.

While for purposes of explanation the above example describes performing a trustworthiness operation with regard to IoT Device 2 150, the trustworthiness operation is similarly performed by Trustworthiness Hub Logic 114 for each individual one of the IoT devices in IoT Devices 130.

Figure 2:
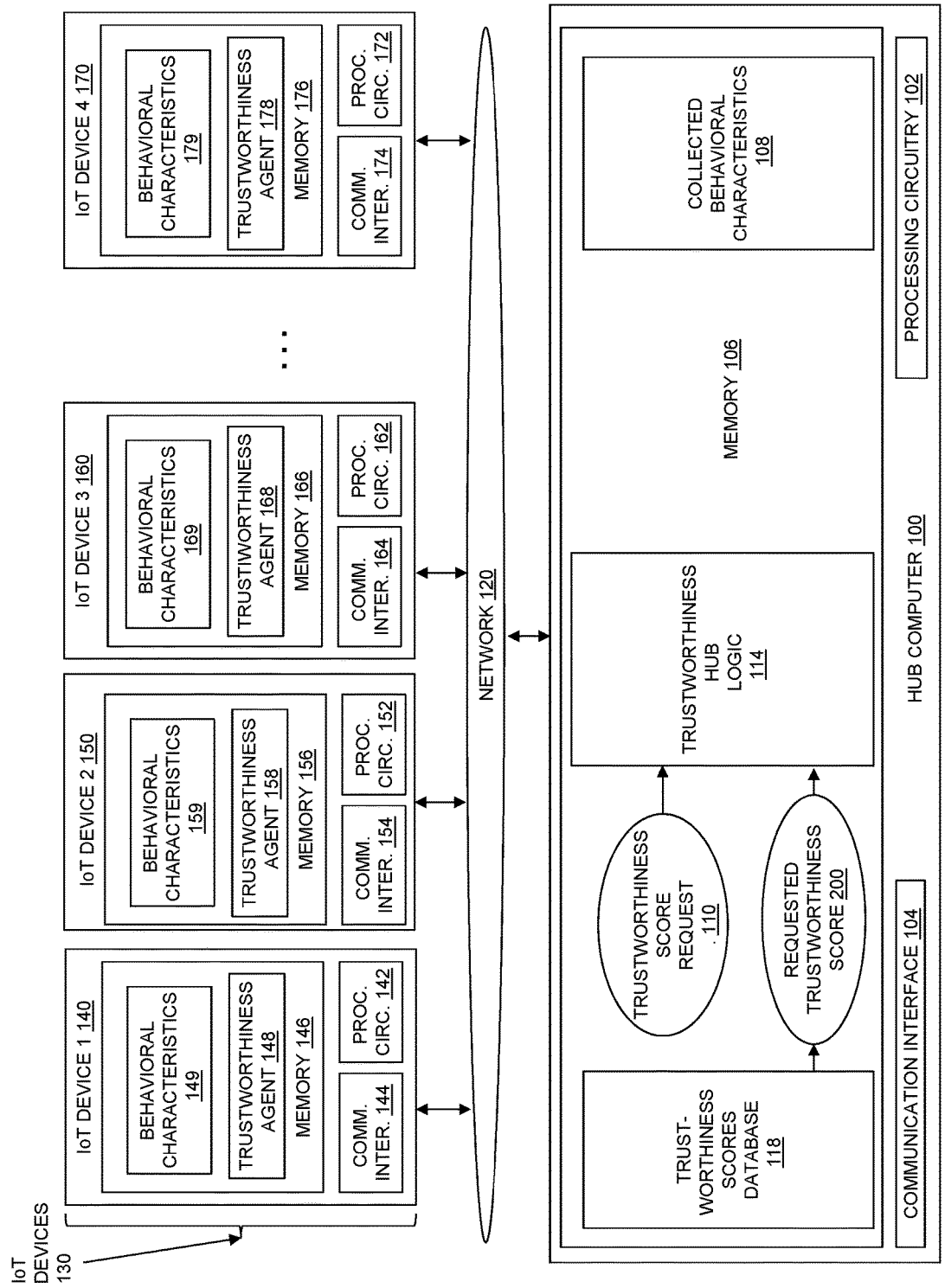
FIG. 2 is a block diagram showing the components of FIG. 1 while operating to process a request for a trustworthiness score received in the hub computer.

FIG. 2 is a block diagram showing the components of FIG. 1 while Hub Computer 100 operates to process a request for a trustworthiness score received from one of the IoT Devices 130. As shown in FIG. 2, Hub Computer 100 receives, from one of the IoT Devices 130, a request (e.g. Trustworthiness Score Request 110) for the trustworthiness score of another one of the IoT Devices 130. For example, in the case where IoT Device 2 150 sends a communication request to IoT Device 1 140 (a request to establish a connection between IoT Device 2 150 and IoT Device 140, such as a TCP connection or other type of communication connection), Trustworthiness Agent 148 may send Trustworthiness Score Request 110 to Hub Computer 100, to request the trustworthiness score for IoT Device 2 150, before allowing any communications to be performed between IoT Device 2 150 and IoT Device 1 140. In response to receipt of Trustworthiness Score Request 110 by Hub Computer 100, Trustworthiness Hub Logic 114 retrieves the trustworthiness score for IoT Device 2 150 from Trustworthiness Scores Database 118, shown in FIG. 2 by Requested Trustworthiness Score 200. Trustworthiness Hub Logic 114 then transmits Requested Trustworthiness Score 200 to the requesting IoT device, in this example IoT Device 1 140.

Figure 3:
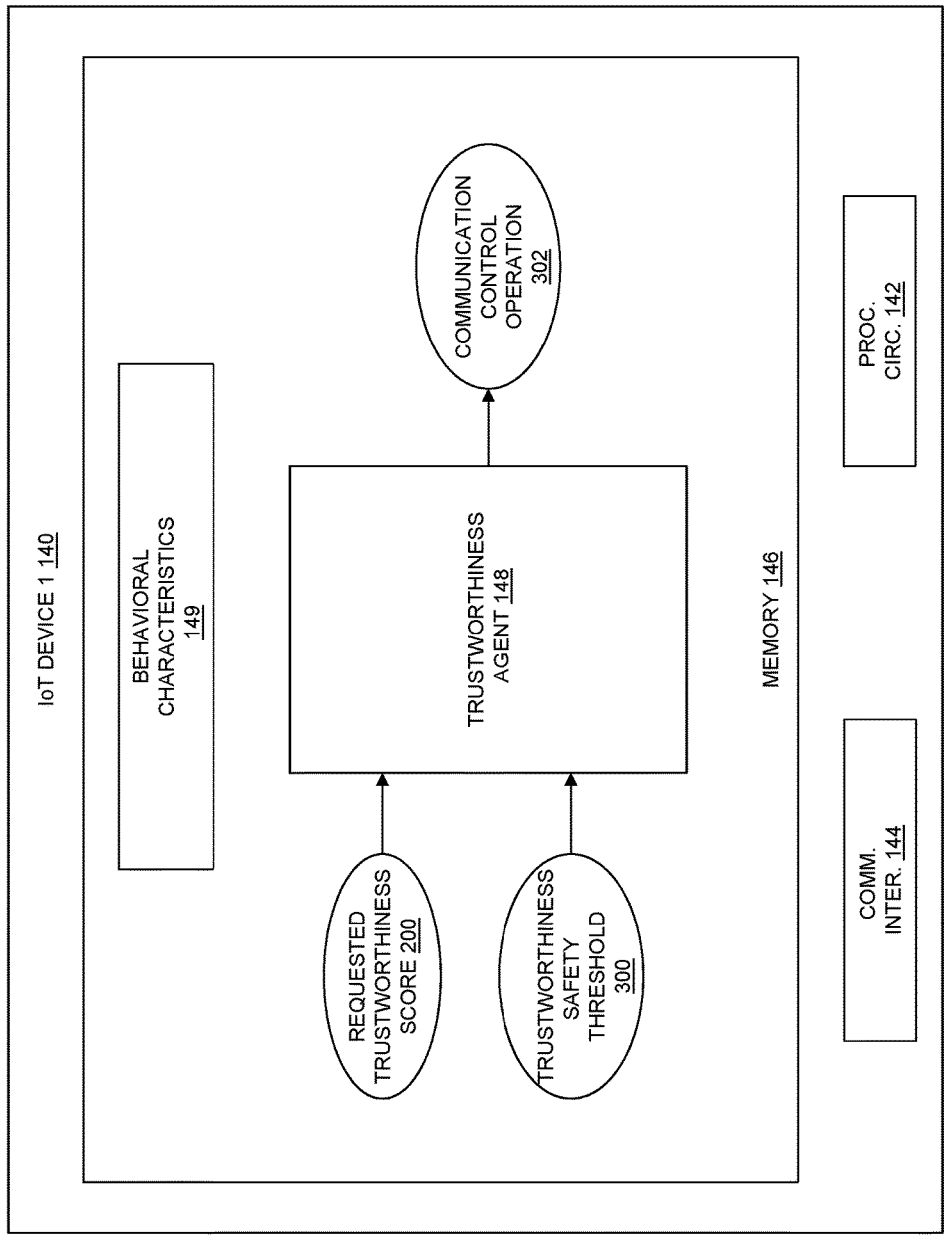
FIG. 3 is block diagram showing an IoT device while operating to process a trustworthiness score for another device that it received from the hub computer.

FIG. 3 is block diagram showing an example of an IoT device operating to process a trustworthiness score for another device that it received from the hub computer. In the example of FIG. 3, IoT Device 1 140 receives Request Trustworthiness Score 200 from Hub Computer 100. Trustworthiness Agent 148 operates to compare Requested Trustworthiness Score 200 to a threshold level of trustworthiness (e.g. Trustworthiness Safety Threshold 300) prior to allowing any communications to be performed by IoT Device 2 150 with regard to IoT Device 140 (e.g. prior to allowing IoT Device 2 150 to access any information or functionality in IoT Device 1 140). For example, in the case where Requested Trustworthiness Score 200 includes or indicates a percentage of behavioral characteristics recently received from IoT Device 2 150 that match expected behavioral characteristics for IoT Device 2 150 (e.g. the percentage of Recently Collected Behavioral Characteristics 110 that match behavioral characteristics in Set(s) 112 of Expected Behavioral Characteristics), then Trustworthiness Safety Threshold 300 may include or indicate a minimum percentage of matching behavioral characteristics that must exist in order to allow communications with IoT Device 140. Based on the comparison of Requested Trustworthiness Score 200 to Trustworthiness Safety Threshold 300, Trustworthiness Agent performs Communication Control Operation 302. For example, if the percentage of matching behavioral characteristics indicated by Requested Trustworthiness Score 200 is less than the percentage indicated by Trustworthiness Safety Threshold 300, then Trustworthiness Agent 148 may perform a Communication Control Operation 302 that prevents communications from being established between IoT Device 2 150 and IoT Device 1 140 (e.g. prevents establishment of a TCP connection or other communication connection between IoT Device 2 150 and IoT Device 1 140). Alternatively, Communication Control Operation 302 may granted IoT Device 2 150 only limited access to IoT Device 140, e.g. to only some portion of the information or resources contained within IoT Device 140, in response to Requested Trustworthiness Score 200 being less than Trustworthiness Safety Threshold 300. In another alternative, if Requested Trustworthiness Score 200 is equal to or greater than Trustworthiness Safety Threshold 300, then Trustworthiness Agent 148 may perform a Communication Control Operation 302 that allows communications between IoT Device 2 150 and IoT Device 1 140 (e.g. allows establishment of a TCP connection between IoT Device 2 150 and IoT Device 1 140). The value of Trustworthiness Safety Threshold 300 may be higher for individual IoT devices that require relatively high levels of security, or lower for IoT devices that require relatively low levels of security.

Figure 4:
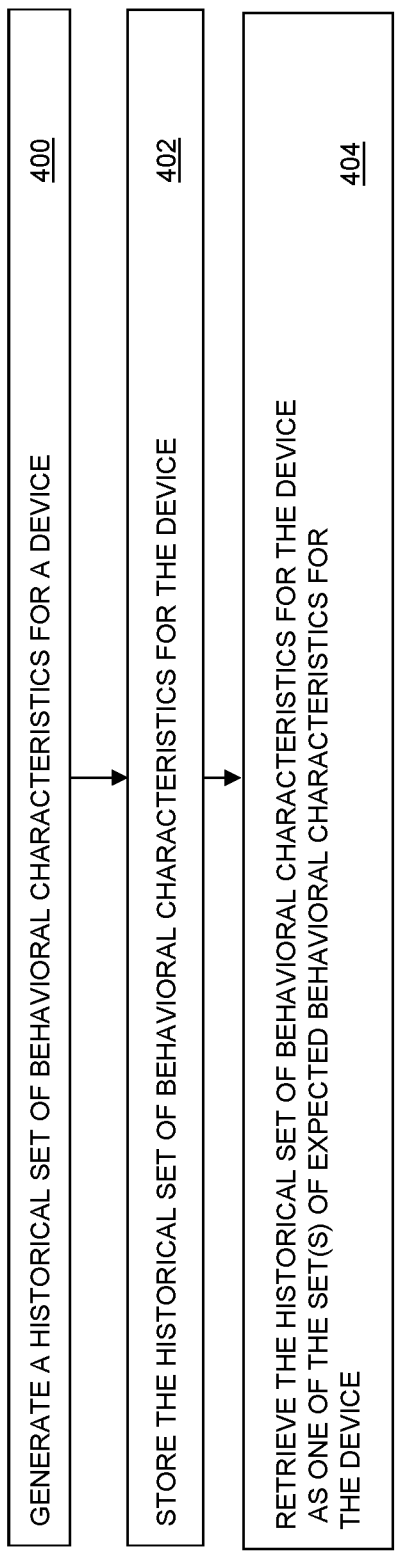
FIG. 4 is a flow chart showing steps performed by an example of the hub computer shown in FIG. 1 to generate a historical set of behavioral characteristics for a device for use as a set of expected behavioral characteristics for the device.

FIG. 4 is a flow chart showing an example of steps performed by the Hub Computer 100 to generate a historical set of behavioral characteristics for a device for use as a set of expected behavioral characteristics for the device. In the example of FIG. 4, while performing a trustworthiness operation for one of the IoT Devices 130, the Trustworthiness Hub Logic 114 in Hub Computer 100 extracts the set of behavioral characteristics most recently collected from the device by extracting behavioral characteristics from Collected Behavioral Characteristics 108 that were collected by Hub Computer 100 from the device during a recent time period. In one example, the behavioral characteristics collected by Hub Computer 100 from the device during the recent time period consist of those behavioral characteristics received from the device in a most recently received message containing the current behavioral characteristics of the device. Accordingly, in such an example, the recent time period consists of the time period since receipt of the most recently received message containing the current behavioral characteristics of the device. In another example, the behavioral characteristics collected by Hub Computer 100 from the device during the recent time period may consist of behavioral characteristics received from the device in multiple messages, and accordingly the recent time period consists of the time since receipt of the first one of the multiple messages.

At step 400, the Trustworthiness Hub Logic 114 generates a historical set of behavioral characteristics for the device by extracting, from the Collected Behavioral Characteristics 108, at least one behavioral characteristic that was collected by the Hub Computer 100 from the device during a historical time period preceding the recent time period during which the set of behavioral characteristics most recently collected from the device were collected. For example, the historical time period may consist of the time from when one or more behavioral characteristics were first collected from the device, and extending up until the beginning of the recent time period during which the set of behavioral characteristics most recently collected from the device were collected. Alternatively, the historical time period may be a fixed duration time period preceding the beginning of the recent time period. At step 402, Trustworthiness Hub Logic 114 stores the historical set of behavioral characteristics for the device generated at step 400 within the hub computer.

As shown in step 404, retrieving at least one set of expected behavioral characteristics for the device, from within the hub computer, by the Trustworthiness Hub Logic 114 while performing the trustworthiness operation for the device, may include retrieving the historical set of behavioral characteristics for the device generated at step 400 from within the hub computer.

Figure 5:
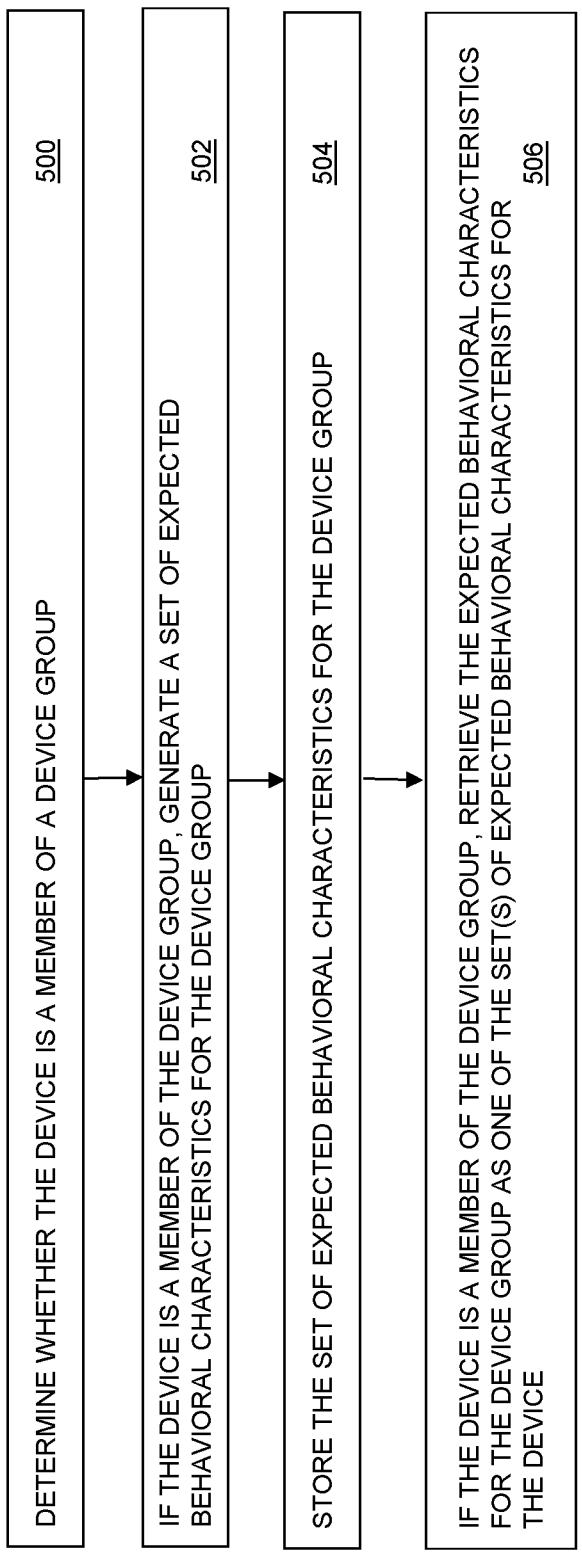
FIG. 5 is a flow chart showing steps performed by an example the hub computer shown in FIG. 1 to generate a set of expected behavioral characteristics for a group of devices, and to use the set of expected behavioral characteristics for the group of devices as a set of expected behavioral characteristics for a device that is a member of the device group.

FIG. 5 is a flow chart showing an example of steps performed by Hub Computer 100 to generate a set of expected behavioral characteristics for a group of devices (a "device group"), and to use the set of expected behavioral characteristics for the device group as a set of expected behavioral characteristics for a device that is a member of the device group. In the example of FIG. 5, while performing a trustworthiness operation for one of the IoT Devices 130, at step 500 the Trustworthiness Hub Logic 114 in Hub Computer 100 determines whether the device is a member of a device group. In one embodiment, Trustworthiness Hub Logic 114 determines whether a device is a member of a device group by comparing the behavioral characteristics collected from the device to behavioral characteristics previously collected from other devices that are members of the group. If at least a majority of the behavioral characteristics collected from the device match behavioral characteristics previously collected from at least a majority of the other devices that are members of the device group, then the device is determined to be a member of the device group. For example, in the case of a device group that includes five member devices other than the device for which the trustworthiness operation is being performed, if each one of at least a majority of the behavioral characteristics previously collected from the device matches a behavioral characteristic that was previously collected at least once from three or more of the other devices that are members of the device group, then the device is determined to be a member of the device group. If less than a majority of the behavioral characteristics collected from the device match behavioral characteristics previously collected from at least a majority of the other devices that are members of the device group, then Trustworthiness Hub Logic 114 determines that the device is not a member of the device group. Those skilled in the art will recognize that other proportions of similarity (other than at least a majority) may alternatively be used to determine whether a device is a member of a device group.

In an alternative embodiment, at step 500 Trustworthiness Hub Logic 114 determines whether a device is a member of a device group by comparing a device type collected from the device to a device type that is common to all members of the group. For example, in the case of a "kitchen appliance" device group, consisting of devices that are kitchen appliances, each device in the device group provides a device type of "kitchen appliance" to Hub Computer 100, e.g. as part of the behavioral characteristics collected from the device. Similarly, in the example of a "vehicle" device group, consisting of devices that are automobiles and other motor vehicles, each device in the device group provides a device type of "vehicle" to Hub Computer 100, e.g. as part of the behavioral characteristics collected from the device. In such an embodiment, at step 500 Trustworthiness Hub Logic 114 determines whether a device is a member of a device group by receiving, at the Hub Computer 100 from the device, a device type of the device (e.g. a device type behavioral characteristic), and then comparing the device type received from the device to a device type received from all other devices in the device group. Trustworthiness Hub Logic 114 determines that the device is a member of the device group in response to the device type received from the device matching the device type received from the other devices in the device group. Trustworthiness Hub Logic 114 determines that the device is not a member of the device group in response to the device type received from the device not matching the device type received from the other devices in the device group.

At step 502, in response to determining that the device is a member of the device group at step 500, Trustworthiness Hub Logic 114 generates a set of expected behavioral characteristics for a device group by extracting, from the Collected Behavioral Characteristics 108, at least one behavioral characteristic that was previously collected by the hub computer from at least one other device that is a member of the device group. For example, with reference to FIG. 1, in the case where IoT Device 2 150 and IoT Device 3 160 are both members of a device group, while performing a trustworthiness operation for IoT Device 2 150 Trustworthiness Hub Logic 114 may generate a set of expected behavioral characteristics for the device group by extracting, from Collected Behavioral Characteristics 108, at least one behavioral characteristic that was previously collected from IoT Device 3 160. At step 504 Trustworthiness Hub Logic 114 stores the set of expected behavioral characteristics for the device group in Hub Computer 100.

At step 506, further in response to the determination at step 500 that the device is a member of the device group, Trustworthiness Hub Logic 114 retrieves the set of expected behavioral characteristics for the device group as one of the Set(s) 112 of Expected Behavioral Characteristics shown in FIG. 1.

Figure 6:
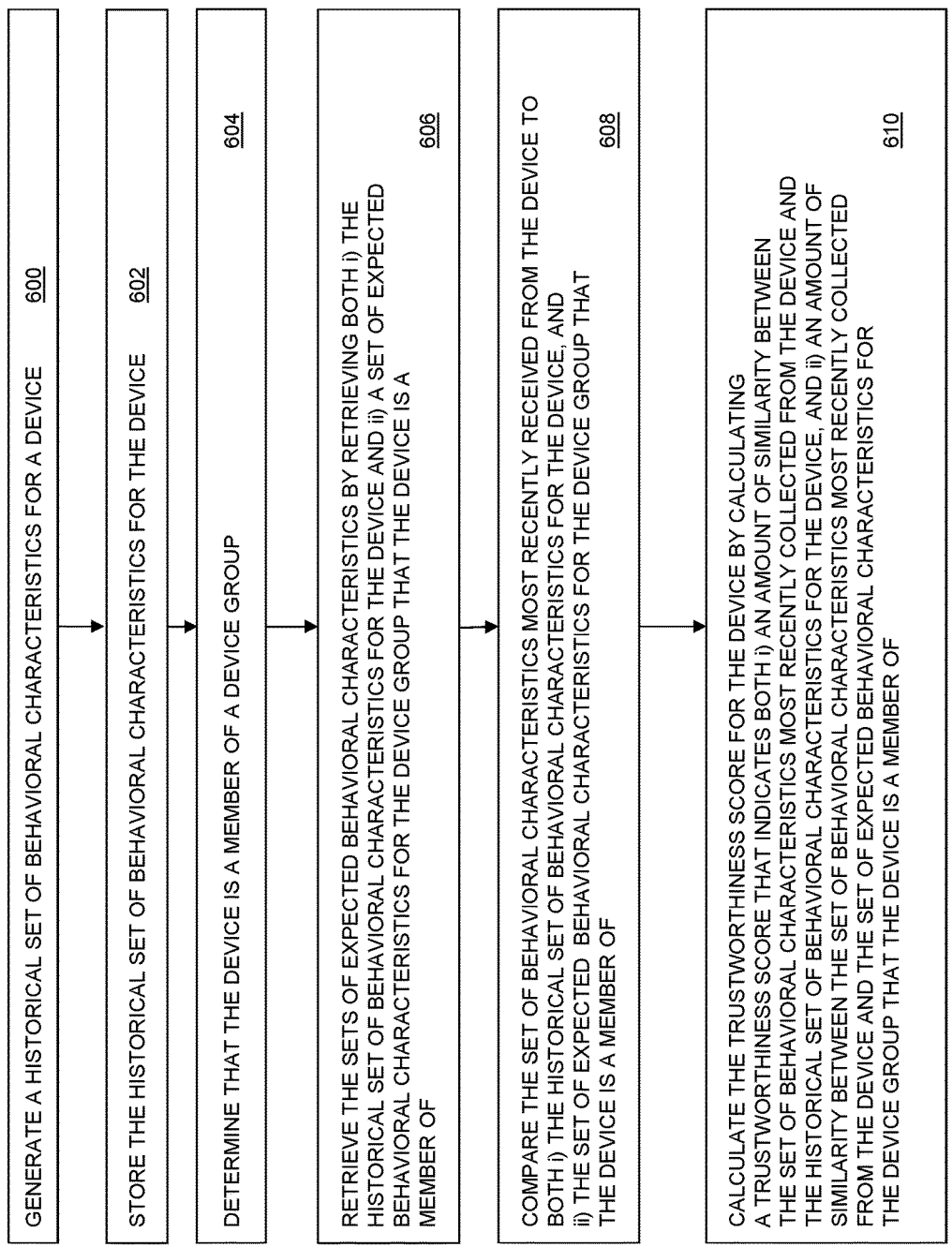
FIG. 6 is a flow chart showing steps performed by an example of the hub computer shown in FIG. 1 to generate a historical set of behavioral characteristics for a device, and to use the historical set of behavioral characteristics for the device and a set of expected behavioral characteristics associated with a device group that the device is a member of to calculate a trustworthiness score for the device.

FIG. 6 is a flow chart showing an example of steps performed by the Hub Computer 100 shown in FIG. 1, while performing a trustworthiness operation for a device, to generate a historical set of behavioral characteristics for the device, and to use both the historical set of behavioral characteristics for the device and a set of expected behavioral characteristics for a device group that the device is a member of to calculate a trustworthiness score for the device. As shown in FIG. 6, at step 600 the Trustworthiness Hub Logic 114 generates a historical set of behavioral characteristics for the device by extracting, from the Collected Behavioral Characteristics 108, at least one behavioral characteristic that was collected by Hub Computer 100 from the device within a historical time period, wherein the historical time period precedes the recent time period during which the set of behavioral characteristics most recently collected from the device were collected. At step 602 the Trustworthiness Hub Logic 114 stores the historical set of behavioral characteristics for the device within the Hub Computer 100 (e.g. as one of Set(s) 112 of Expected Behavioral Characteristics shown in FIG. 1). At step 604, Trustworthiness Hub Logic 114, determines that the device is one of a plurality of members of a device group, wherein the members of the device group are a subset of the multiple devices from which behavioral characteristics are collected by Hub Computer 100. For example, the members of the device group may be a subset of the devices from which Hub Computer 100 collects behavioral characteristics that does not include all of the devices from which Hub Computer 100 collects behavioral characteristics.

At step 606, as part of retrieving the Set(s) 112 of Expected Behavioral Characteristics from within Hub Computer 100, Trustworthiness Hub Logic 114 retrieves the historical set of behavioral characteristics for the device generated at step 600, and also, in response to determining at step 604 that the device is one of the members of the device group, retrieves a set of expected behavioral characteristics associated with the device group.

At step 608, Trustworthiness Hub Logic 114 compares the set of behavioral characteristics most recently collected from the device (e.g. Recently Collected Behavioral Characteristics 110) to the Set(s) 112 of Expected Behavioral Characteristics by both i) comparing the set of behavioral characteristics most recently collected from the device to the historical set of behavioral characteristics for the device generated at step 600, and ii) comparing the set of behavioral characteristics most recently collected from the device to the set of expected behavioral characteristics associated with the device group.

At step 610, Trustworthiness Hub Logic 114 calculates the trustworthiness score for the device (e.g. Device Trustworthiness Score 116) by calculating a trustworthiness score that indicates both i) an amount of similarity between the set of behavioral characteristics most recently collected from the device (e.g. Recently Collected Behavioral Characteristics 110) and the historical set of behavioral characteristics for the device, and ii) an amount of similarity between the set of behavioral characteristics most recently collected from the device (e.g. Recently Collected Behavioral Characteristics 110) and the set of expected behavioral characteristics associated with the device group. For example, Trustworthiness Hub Logic 114 may compare each of the behavioral characteristics in the set of behavioral characteristics most recently collected from the device to each of the behavioral characteristics contained in the historical set of behavioral characteristics for the device, and to each of the behavioral characteristics contained in the set of expected behavioral characteristics for the device group. The resulting Device Trustworthiness Score 116 may accordingly be a percentage of behavioral characteristics in Recently Collected Behavioral Characteristics 110 that match a behavioral characteristic contained in either i) the historical set of behavioral characteristics for the device, or ii) the behavioral characteristics contained in the set of expected behavioral characteristics for the device group. Alternatively, matches of behavioral characteristics in the Recently Collected Behavioral Characteristics 110 to individual behavioral characteristics contained in the historical set of behavioral characteristics for the device may be weighted differently in the resulting Device Trustworthiness Score 116 from matches of behavioral characteristics in the Recently Collected Behavioral Characteristics 110 to behavioral characteristics in the set of expected behavioral characteristics for the device group. Various other specific techniques may be used to determine a Device Trustworthiness Score 116 based on matches between behavioral characteristics in Recently Collected Behavioral Characteristics 110 and behavioral characteristics contained in either the historical set of behavioral characteristics for the device and/or matches between behavioral characteristics in Recently Collected Behavioral Characteristics 110 and behavioral characteristics contained in the set of expected behavioral characteristics. Examples of other alternative techniques in this regard may be found in U.S. patent application Ser. No. 14/227,766, filed Mar. 27, 2014, and entitled "SELF-LEARNING, ONLINE, MULTI-LAYER METHOD FOR UNSUPERVISED RISK ASSESSMENT", all disclosures of which are hereby included by reference herein.

Figure 7:
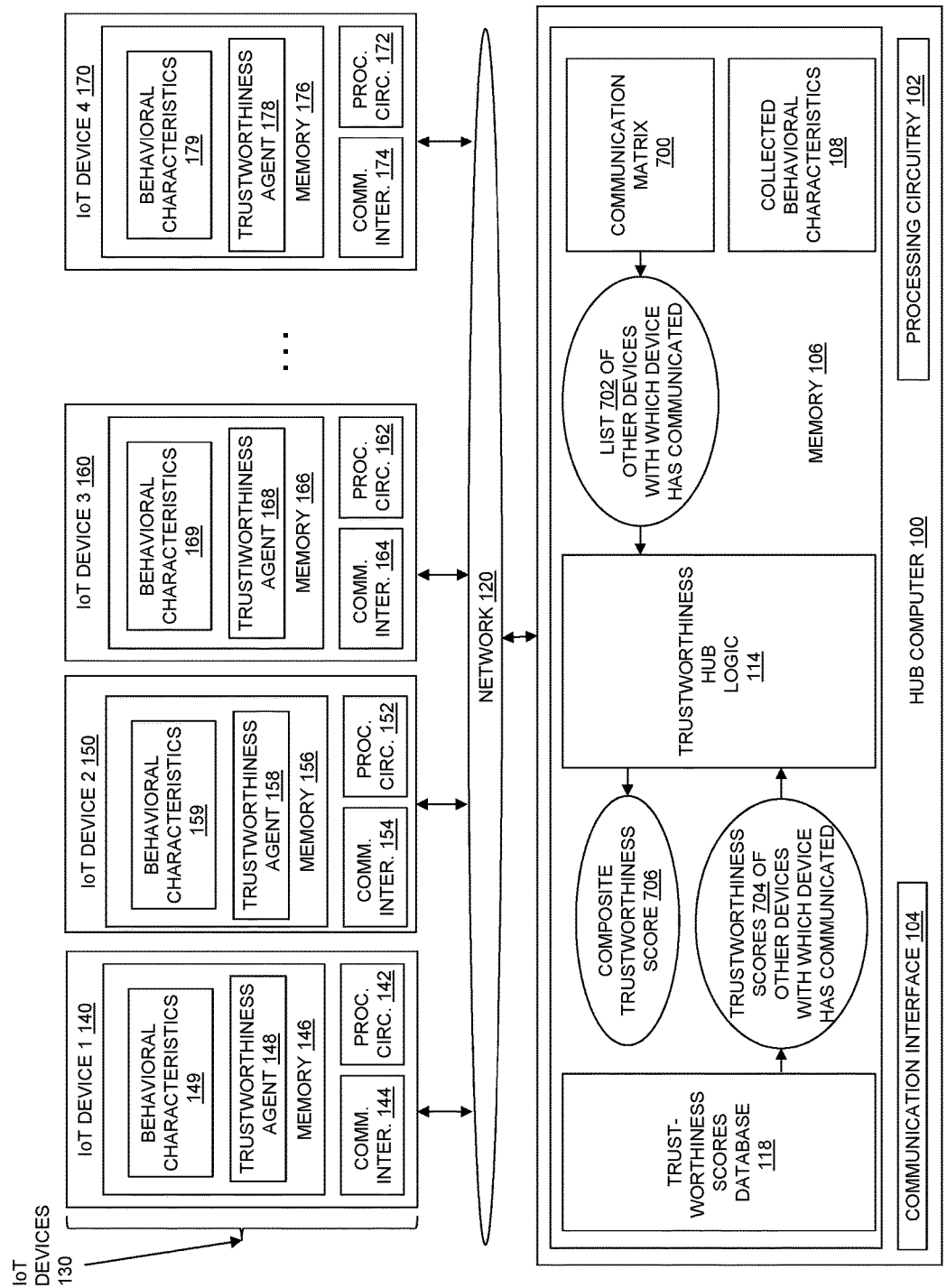
FIG. 7 is a block diagram showing the components of FIG. 1 while performing a trustworthiness operation for a device that includes calculating a composite trustworthiness score for the device using the trustworthiness scores of other devices with which the device has previously communicated.

FIG. 7 is a block diagram showing the components of FIG. 1 while performing a trustworthiness operation for a device that includes calculating a composite trustworthiness score for the device using the trustworthiness scores of other devices with which the device has previously communicated. As shown in FIG. 7, Trustworthiness Hub Logic 114 may maintain, for each one of the multiple IoT Devices 130, a list of all other devices with which the device has communicated. In the example of FIG. 7, a Communication Matrix 700 is maintained by Trustworthiness Hub Logic 114 in Hub Computer 100. Communication Matrix 700 is an example of a data structure that stores, for each of the devices in IoT Devices 130, a list containing identifiers (e.g. device names, device addresses, etc.) of the other devices in IoT Devices 130 with which that device has communicated. The Communication Matrix 700 may, for example, be maintained by Trustworthiness Hub Logic 114 based on behavioral characteristics collected from the IoT Devices 130 indicating the other devices with which each device has communicated.

As also shown in FIG. 7, while performing the trustworthiness operation for one of the IoT Devices 130, Trustworthiness Hub Logic 114 may retrieve the trustworthiness score of each one of the other devices with which the device has previously communicated, from Trustworthiness Scores Database 118, as shown in FIG. 7 by Trustworthiness Scores 704 of Other Devices With Which Device Has Communicated. Trustworthiness Hub Logic 114 then calculates Composite Trustworthiness Score 706 for the device by combining the trustworthiness scores of the other devices with which the device has communicated. The trustworthiness scores of the other devices with which the device has previously communicated may be combined using various specific techniques. For example, the trustworthiness scores of the other devices with which the device has previously communicated may be combined by finding the lowest trustworthiness score of any of the other devices with which the device has previously communicated, and setting the Composite Trustworthiness Score 706 to the lowest trustworthiness score of any of the other devices with which the device has previously communicated. Alternatively, the Composite Trustworthiness Score 706 may be set to an average of the trustworthiness scores of all the other devices with which the device has previously communicated. In another approach, the previous communications between devices in IoT Devices 130 represented in Communication Matrix 700 may be converted by Trustworthiness Hub Logic 114 into a directed graph, in which each device is represented by a vertex ($V_i$), and in which there is an edge from vertex $V_i$ to vertex $V_j$ if a device i communicated with device j. The Composite Trustworthiness Score 706 for a specific one of the IoT Devices 130 may then be calculated by performing a risk averse random walk that travels along the directed graph, with the Composite Trustworthiness Score 706 for a device being set to the probability that the random walk will be at the vertex corresponding to the device in a steady state. See for further explanation the PageRank algorithm for estimating the importance of Web pages in the World Wide Web, as for example described in *The Anatomy of a Large-Scale Hypertextual Web Search Engine*, (1998), Brin, S. and Page, L., Seventh International World-Wide Web Conference (WWW 1998), Apr. 14-18, 1998, Brisbane, Australia, all disclosures of which are hereby included herein by reference.

In an embodiment in which a composite trustworthiness score is calculated by Trustworthiness Hub Logic 114 for each one of the IoT Devices 130, the composite trustworthiness scores may also be stored in the Trustworthiness Scores Database 118. In response to a request for a trustworthiness score of one of the devices in IoT Devices 130, e.g. the request received from IoT Device 1 140 for the trustworthiness score of IoT Device 2 150, Trustworthiness Hub Logic 114 may retrieve the composite trustworthiness score for IoT Device 2 150 from Trustworthiness Scores Database 118 and transmit the composite trustworthiness score for IoT Device 2 150 to IoT Device 1 140. In response to receipt, by the IoT Device 1 140, of the composite trustworthiness score for IoT Device 2 150, the Trustworthiness Agent 148 in IoT Device 1 140 compares the composite trustworthiness score for IoT Device 2 150 to the Trustworthiness Safety Threshold 300, and prevents communications between IoT Device 1 140 and IoT Device 2 150 in response to the composite trustworthiness score for IoT Device 2 150 being less than the Trustworthiness Safety Threshold 300.

While a Composite Trustworthiness Score 706 may be calculated by the disclosed system for device in addition to or instead of a Device Trustworthiness Score 116 that is calculated for the device based on comparing behavioral characteristics recently collected from the device to i) a historical set of behavioral characteristics for the device and/or to ii) a set of expected behavioral characteristics for a device group to which the device belongs, the Composite Trustworthiness Score 706 for a device may alternatively be combined with the Device Trustworthiness Score 116 for the device, in order to generate a single combined trustworthiness score for the device. Such a combined trustworthiness score may be calculated for each device by Trustworthiness Hub Logic 114, and stored for each device in Trustworthiness Scores Database 118, and, for example, may be an average, or a minimum of Device Trustworthiness Score 116 and Composite Trustworthiness Score 706, or may be calculated in whole or in part using techniques described in the above referenced U.S. patent application Ser. No. 14/227,766, filed Mar. 27, 2014, and entitled "SELF-LEARNING, ONLINE, MULTI-LAYER METHOD FOR UNSUPERVISED RISK ASSESSMENT". The combined trustworthiness score for a specific device may be returned by Trustworthiness Hub Logic 114 to a requesting one of the IoT Devices 130, and compared by the requesting device to a trustworthiness safety threshold in order to determine whether communications are to be permitted with the specific device.

Based on the descriptions herein, those skilled in the art will recognize that embodiments of the disclosed technologies may solve significant problems inherent in previous technologies. For example, because the disclosed technology does not require human involvement it can be used to support secure communication between IoT devices that communicate autonomously with each other. The disclosed technology can be used in the passer-by connections between devices that are common for IoT devices, enables IoT devices to determine whether communication are to be permitted or prevented with other IoT devices, consistent with the goals of the "fog architecture" computing approach. And by continuously collecting behavioral characteristics, the disclosed technology supports finding suspicious changes in device behavior even after a point in time at which a device has been determined to be sufficiently trustworthy to allow communications with another device.

While the above description provides examples of embodiments using various specific terms to indicate specific systems, devices, and/or components, such terms are illustrative only, and are used only for purposes of convenience and concise explanation. The disclosed system is not limited to embodiments including or involving systems, devices and/or components identified by the terms used above.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied at least in part in one or more non-transitory computer readable storage medium(s) having computer readable program code stored thereon for causing one or more processors and/or a computer system to carry out those aspects of the present disclosure.

Any combination of one or more non-transitory computer readable storage medium(s) may be utilized. Examples of a non-transitory computer readable storage medium include, but are not limited to, an optical disc (e.g. CD or DVD), an optical storage device, a magnetic disk, a magnetic storage device, a random access memory (RAM), a read-only memory (ROM), an erasable programmable read-only memory (EPROM or Flash memory), and/or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

While the invention is described through the above exemplary embodiments, it will be understood by those of ordinary skill in the art that modification to and variation of the illustrated embodiments may be made without departing from the inventive concepts herein disclosed.

What is claimed is:

1. A computer-implemented method of controlling communication between devices based on trustworthiness scores, comprising:
    continuously collecting, by a hub computer, behavioral characteristics from a plurality of devices, the behavioral characteristics from the plurality of devices being transmitted to the hub computer from the plurality of devices, and the collecting including storing the collected behavioral characteristics within the hub computer;
    performing, by the hub computer for each one of the devices in the plurality of devices, a trustworthiness operation, by
        i) extracting, from the collected behavioral characteristics, a set of behavioral characteristics most recently collected from the device by extracting behavioral characteristics received from the device that were collected by the hub computer from the device during a recent time period,
        ii) generating a historical set of behavioral characteristics for the device by extracting, from the collected behavioral characteristics, at least one behavioral characteristic that was collected by the hub computer from the device within a historical time period, wherein the historical time period precedes the recent time period,
        iii) storing the historical set of behavioral characteristics for the device within the hub computer,
        iv) determining that the device is one of a plurality of members of a device group, wherein the members of the device group are a subset of the plurality of devices,
        v) retrieving at least one set of expected behavioral characteristics from within the hub computer, at least in part by a) retrieving the historical set of behavioral characteristics for the device from within the hub computer, and b) in response to determining that the device is one of the plurality of members of the device group, retrieving a set of expected behavioral characteristics associated with the device group,
        vi) comparing the set of behavioral characteristics most recently collected from the device to the at least one set of expected behavioral characteristics, at least in part by a) comparing the set of behavioral characteristics most recently collected from the device to the historical set of behavioral characteristics for the device, and b) comparing the set of behavioral characteristics most recently collected from the device to the set of expected behavioral characteristics associated with the device group,
        vii) calculating a trustworthiness score for the device that indicates both a) an amount of similarity between the set of behavioral characteristics most recently collected from the device and the historical set of behavioral characteristics for the device, and b) an amount of similarity between the set of behavioral characteristics most recently collected from the device and the set of expected behavioral characteristics associated with the device group, and
        viii) storing the trustworthiness score for the device within the hub computer;
    receiving, at the hub computer from a first device in the plurality of devices, a request for the trustworthiness score for a second device in the plurality of devices;
    in response to the request for the trustworthiness score, the hub computer retrieves the trustworthiness score for the second device and transmits the trustworthiness score for the second device to the first device; and
    in response to receipt, by the first device, of the trustworthiness score for the second device, the first device compares the trustworthiness score for the second device to a trustworthiness safety threshold, and prevents communications between the first device and the second device in response to the trustworthiness score for the second device being less than the trustworthiness safety threshold.

2. The method of claim 1, wherein performing the trustworthiness operation, by the hub computer, for each one of the devices in the plurality of devices, comprises:
    generating the set of expected behavioral characteristics for the device group at least in part by extracting, from the collected behavioral characteristics, at least one behavioral characteristic that was collected by the hub computer from at least one other device that is a member of the device group.

3. The method of claim 2, wherein determining whether the device is a member of the group includes:
    comparing one or more behavioral characteristics collected from the device to one or more behavioral characteristics collected from other devices that are members of the device group;
    determining that the device is a member of the device group in response to each of a majority of the behavioral characteristics collected from the device matching one of the one or more behavioral characteristics collected from at least a majority of the other devices that are members of the device group; and
    determining that the device is not a member of the device group in response to less than a majority of the behavioral characteristics collected from the device matching one of one or more behavioral characteristics collected from at least a majority of the other devices that are members of the device group.

4. The method of claim 2, wherein all devices that are members of the device group are the same type of device, and wherein determining whether the device is a member of the device group includes:
    receiving an indication, by the hub computer from the device, of a device type of the device;

comparing the device type received from the device to a device type received from the other devices in the device group;

determining that the device is a member of the device group in response to the device type received from the device matching the device type received from the other devices in the device group; and determining that the device is not a member of the device group in response to the device type received from the device not matching the device type received from the other devices in the device group.

5. The method of claim 1, wherein the behavioral characteristics collected at the hub computer from the plurality of devices includes, for each one of the devices in the plurality of devices, a behavioral characteristic indicating daily time periods during which the device has externally communicated data.

6. The method of claim 1, wherein the behavioral characteristics collected from the plurality of devices includes, for each one of the devices in the plurality of devices, a behavioral characteristic indicating an average rate at which each the device has externally communicated data.

7. The method of claim 1, wherein the behavioral characteristics collected from the plurality of devices includes, for each individual one of the devices in the plurality of devices, a behavioral characteristic indicating port numbers of communication ports used by the device to externally communicate data.

8. The method of claim 1, wherein the behavioral characteristics collected from the plurality of devices includes, for each individual one of the devices in the plurality of devices, a behavioral characteristic indicating software programs that have executed on the device.

9. The method of claim 1, wherein the behavioral characteristics collected from the plurality of devices includes, for each individual one of the devices in the plurality of devices, a behavioral characteristic indicating all other devices with which the device has communicated.

10. The method of claim 9, further comprising:

for each one of the devices in the plurality of devices, maintaining a list in the hub computer of all other devices with which the device has communicated;

wherein performing the trustworthiness operation, by the hub computer for each one of the devices in the plurality of devices further includes ix) retrieving the trustworthiness score of each one of the other devices with which the device has communicated, and x) calculating a composite trustworthiness score for the device by combining the trustworthiness scores of the other devices with which the device has communicated;

wherein the hub computer, further in response to the request for the trustworthiness score, retrieves the composite trustworthiness score for the second device and transmits the composite trustworthiness score for the second device to the first device; and wherein the first device, in response to receipt of the composite trustworthiness score for the second device, compares the composite trustworthiness score for the second device to the trustworthiness safety threshold, and prevents communications between the first device and the second device in response to the composite trustworthiness score for the second device being less than the trustworthiness safety threshold.

11. A computer program product including a non-transitory computer readable medium which stores program code operable to control communication between devices based on trustworthiness scores, the program code comprising:

program code for continuously collecting, at a hub computer, behavioral characteristics from a plurality of devices, the behavioral characteristics from the plurality of devices being transmitted to the hub computer from the plurality of devices, and the collecting including storing the collected behavioral characteristics within the hub computer;

program code for performing, by the hub computer for each one of the devices in the plurality of devices, a trustworthiness operation, by i) extracting, from the collected behavioral characteristics, a set of behavioral characteristics most recently collected from the device by extracting behavioral characteristics received from the device that were collected by the hub computer from the device during a recent time period, ii) generating a historical set of behavioral characteristics for the device by extracting, from the collected behavioral characteristics, at least one behavioral characteristic that was collected by the hub computer from the device within a historical time period, wherein the historical time period precedes the recent time period, iii) storing the historical set of behavioral characteristics for the device within the hub computer, iv) determining that the device is one of a plurality of members of a device group, wherein the members of the device group are a subset of the plurality of devices, v) retrieving at least one set of expected behavioral characteristics from within the hub computer, at least in part by a) retrieving the historical set of behavioral characteristics for the device from within the hub computer, and b) in response to determining that the device is one of the plurality of members of the device group, retrieving a set of expected behavioral characteristics associated with the device group, vi) comparing the set of behavioral characteristics most recently collected from the device to the at least one set of expected behavioral characteristics, at least in part by a) comparing the set of behavioral characteristics most recently collected from the device to the historical set of behavioral characteristics for the device, and b) comparing the set of behavioral characteristics most recently collected from the device to the set of expected behavioral characteristics associated with the device group, vii) calculating a trustworthiness score for the device that indicates both a) an amount of similarity between the set of behavioral characteristics most recently collected from the device and the historical set of behavioral characteristics for the device, and b) an amount of similarity between the set of behavioral characteristics most recently collected from the device and the set of expected behavioral characteristics associated with the device group, and viii) storing the trustworthiness score for the device within the hub computer;

program code for receiving, at the hub computer from a first device in the plurality of devices, a request for the trustworthiness score for a second device in the plurality of devices;

program code for retrieving, by the hub computer in response to the request for the trustworthiness score, the trustworthiness score for the second device, and for transmitting the trustworthiness score for the second device to the first device; and program code for, in response to receipt, by the first device, of the trustworthiness score for the second device, comparing, by the first device, the trustworthiness score for the second device to a trustworthiness safety threshold, and for preventing communications between the first device and the second device in response to the trustworthiness score for the second device being less than the trustworthiness safety threshold.

12. A system for controlling communication between devices based on trustworthiness scores, comprising:
a plurality of devices, each device including processing circuitry communicably coupled to a memory;
a hub computer including processing circuitry communicably coupled to a memory, the memory of the hub computer having program code stored therein which, when executed by the processing circuitry of the hub computer, causes the hub computer to:
continuously collect behavioral characteristics from the plurality of devices, the behavioral characteristics from the plurality of devices being transmitted to the hub computer from the plurality of devices, and the collecting including storing the collected behavioral characteristics within the hub computer,
perform, for each one of the devices in the plurality of devices, a trustworthiness operation, by
i) extracting, from the collected behavioral characteristics, a set of behavioral characteristics most recently collected from the device by extracting behavioral characteristics received from the device that were collected by the hub computer from the device during a recent time period,
ii) generating a historical set of behavioral characteristics for the device by extracting, from the collected behavioral characteristics, at least one behavioral characteristic that was collected by the hub computer from the device within a historical time period, wherein the historical time period precedes the recent time period,
iii) storing the historical set of behavioral characteristics for the device within the hub computer,
iv) determining that the device is one of a plurality of members of a device group, wherein the members of the device group are a subset of the plurality of devices,
v) retrieving at least one set of expected behavioral characteristics from within the hub computer, at least in part by a) retrieving the historical set of behavioral characteristics for the device from within the hub computer, and b) in response to determining that the device is one of the plurality of members of the device group, retrieving a set of expected behavioral characteristics associated with the device group,
vi) comparing the set of behavioral characteristics most recently collected from the device to the at least one set of expected behavioral characteristics, at least in part by a) comparing the set of behavioral characteristics most recently collected from the device to the historical set of behavioral characteristics for the device, and b) comparing the set of behavioral characteristics most recently collected from the device to the set of expected behavioral characteristics associated with the device group, vii) calculating a trustworthiness score for the device that indicates both a) an amount of similarity between the set of behavioral characteristics most recently collected from the device and the historical set of behavioral characteristics for the device, and b) an amount of similarity between the set of behavioral characteristics most recently collected from the device and the set of expected behavioral characteristics associated with the device group, and
viii) storing the trustworthiness score for the device within the hub computer,
receive, from a first device in the plurality of devices, a request for the trustworthiness score for a second device in the plurality of devices, and
in response to the request for the trustworthiness score, retrieve the trustworthiness score for the second device and transmits the trustworthiness score for the second device to the first device; and
wherein the memory of the first device stores program code, which, when executed by the processing circuitry of the first device in response to receipt, by the first device, of the trustworthiness score for the second device, compares the trustworthiness score for the second device to a trustworthiness safety threshold, and prevents communications between the first device and the second device in response to the trustworthiness score for the second device being less than the trustworthiness safety threshold.

13. The system for controlling communication between devices based on trustworthiness scores of claim 12, wherein the behavioral characteristics collected at the hub computer from the plurality of devices includes, for each one of the devices in the plurality of devices, a behavioral characteristic indicating daily time periods during which the device has externally communicated data.

14. The system for controlling communication between devices based on trustworthiness scores of claim 12, wherein the behavioral characteristics collected from the plurality of devices includes, for each one of the devices in the plurality of devices, a behavioral characteristic indicating an average rate at which each the device has externally communicated data.

15. The system for controlling communication between devices based on trustworthiness scores of claim 12, wherein the behavioral characteristics collected from the plurality of devices includes, for each individual one of the devices in the plurality of devices, a behavioral characteristic indicating port numbers of communication ports used by the device to externally communicate data.

16. The system for controlling communication between devices based on trustworthiness scores of claim 12, wherein the behavioral characteristics collected from the plurality of devices includes, for each individual one of the devices in the plurality of devices, a behavioral characteristic indicating software programs that have executed on the device.

17. The system for controlling communication between devices based on trustworthiness scores of claim 12, wherein the behavioral characteristics collected from the plurality of devices includes, for each individual one of the devices in the plurality of devices, a behavioral characteristic indicating all other devices with which the device has communicated.

* * * * *